Patented Aug. 1, 1933

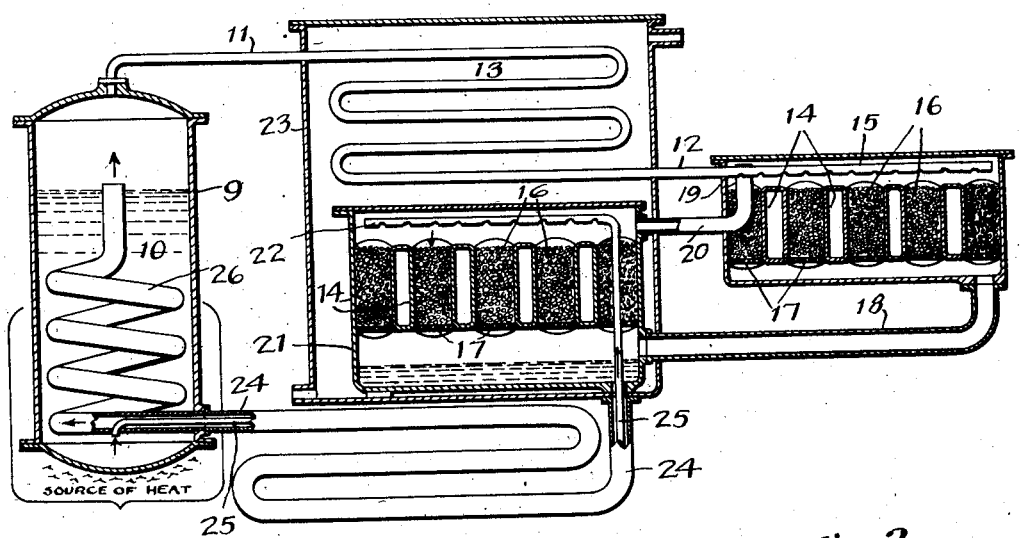
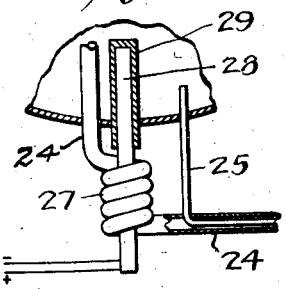
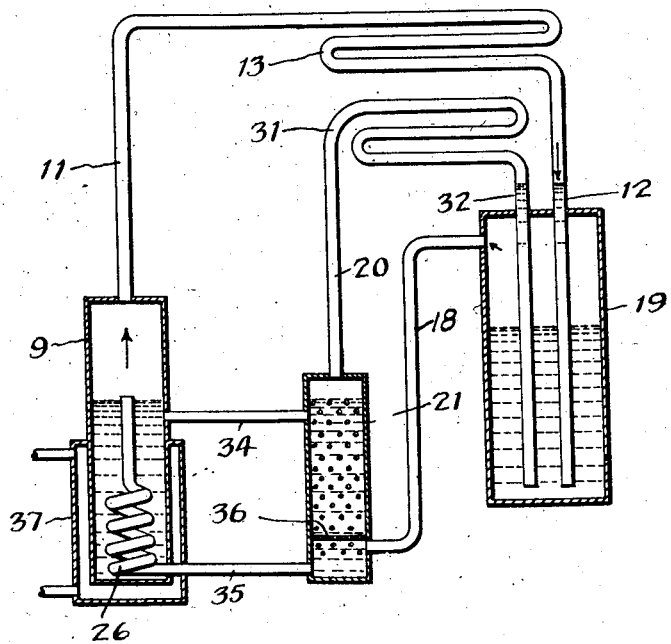

1,920,612

UNITED STATES PATENT OFFICE 1,920,612

REFRIGERATION

Baltzar Carl von Platen and Carl Georg Munters, Stockholm, Sweden, assignors to Electrolux Servel Corporation, New York, N. Y., a Corporation of Delaware Application June 17, 1926, Serial No. 116,751
Renewed March 2, 1932

12 Claims. (Cl. 62—119.5)

This application is to be considered as relating back to our copending application Serial No. 691,477 filed February 8, 1924.

The invention relates to refrigeration and more particularly to refrigeration of the absorption type wherein pressure is maintained constant throughout the refrigerator or in which the pressure is partially equalized by use of an auxiliary agent into which the refrigerating medium proper diffuses and whereby a drop in partial pressure takes place, producing refrigeration.

As a refrigerant, ammonia has commonly been used. When used in refrigerating apparatus of the absorption type with constant pressure throughout, the pressure in the apparatus is from 150–200 pounds. Furthermore, when ammonia is used in combination with water, a considerable amount of water vapor is often entrained with the ammonia vapor.

We have found that by the use of an amine or a combination of amines the pressure in the refrigerating apparatus may be decreased considerably, to about half of that needed when ammonia is used, for instance to 114 lbs/sq. in. at a temperature of 122° F. compared with 285 lbs/sq. in. for ammonia. The advantages of the lower pressure such as lightness and cheapness of manufacture are obvious. Undoubtedly the greatest advantage of the low pressure is however that for a high temperature of the cooling water (or air) for cooling the condenser, which temperature determines the total pressure in the apparatus, an ever so much lower pressure is needed when amine is used. Furthermore we have found that by using an amine, particularly methyl-amine, less water vapor is entrained with vapor of the refrigerating medium, that the solubility in water is greater than for ammonia, that the difference in specific weight between hydrogen and methyl-amine is about double the difference between hydrogen and ammonia and that the molal latent heat of methyl-amine is greater than that of ammonia. Thus great advantages are obtained by the use of substances of the class referred to in place of ammonia.

For purposes of description the invention is set out with reference to illustrations of apparatus in an accompanying drawing in which Figure 1 shows one form of refrigerator to which our invention may be applied; Figure 2 shows a modification of part of the apparatus shown in Figure 1; and Figure 3 shows a second form of apparatus in which we obtain unusual results by the use of the amine, in which case particularly in combination with isobutane ($C_4H_{10}$) as an auxiliary agent.

Referring more particularly to Figure 1, 9 designates a generator which contains the refrigerant or cooling agent, in this case an amine, preferably methylamine, dissolved in a suitable absorption liquid such as water. Amines are to be considered as ammonia ($NH_3$) in which one or more hydrogen atoms are replaced by some radical, for instance methyl ($CH_3$). If one hydrogen atom in $NH_3$ is replaced, the result is mono-methylamine ($CH_3NH_2$) usually called methylamine for short. If two hydrogen atoms are exchanged the result is di-methyl-amine ($CH_3)_2NH$ and if three are exchanged the result is tri-methyl-amine. The generator may be heated by any of various known means. The vapor of methyl-amine is expelled from the solution 10 in the generator and passes through conduit 11 into the condenser 13 in which the vapor is condensed due to the cooling effect of a cooling fluid such as water, which is caused to circulate through the tank 23 in which condenser 13 is placed. The condenser is connected with an evaporator 19, which constitutes the refrigerating member, by means of a conduit 12. Within the evaporator is a perforated distributor 15 which connects with conduit 12 and through the perforations of which liquid methyl-amine is introduced into the evaporator. Within the evaporator there is preferably placed means for distributing and dividing the liquid methyl-amine over a large surface. For this purpose there is shown a series of tubular cells 14 which communicate with each other at the top and at the bottom and which are provided with perforated bottoms 17. These cells contain a porous or fibrous material 16 which may consist of metal wool or cuttings.

The evaporator 19 is connected to the absorber 21 by means of conduits 18 and 20 which are preferably arranged to form a heat exchanger. This may be accomplished by having pipe 20 pass within pipe 18. Pipe 20 connects the top of the absorber with the top of the evaporator and pipe 18 connects the bottom of the evaporator with the lower part of the absorber. The absorber is enclosed in tank 23 and is also cooled by the cooling fluid flowing through the same.

The generator 9 and absorber 21 are interconnected by means of pipes 24 and 25 which preferably are arranged to form a heat exchanger. Pipe 25 lies within pipe 24 and extends from the lower part of the generator to the upper part of the absorber where it terminates in a perforated distributor 22. Like the evaporator, the absorber preferably contains distributing means such as the tubular cells 14 provided with perforated bottoms 17 and containing distributing material 16. Pipe 24 connects the lower part of the absorber with the upper part of the generator and, in the example shown, extends into the generator and passes upwardly through the solution 10 therein in the form of a coil 26.

The operation of the refrigerator is as follows:—

Heat is applied to generator 9 whereupon methyl-amine is abstracted from the solution 10 and passes in the form of vapor through conduit 11 into the condenser 13. In condenser 13 the vapor is condensed and passes on through conduit 12 to the evaporator. The liquid methyl-amine entering the evaporator is spread over the distributing material 16 by help of the perforated distributor 15. The evaporator is supplied with the auxiliary agent such as hydrogen into which and in the presence of which the mono-methyl-amine diffuses and evaporates. This process of diffusion of the cooling agent into the auxiliary agent (which obviously entails diffusion of the auxiliary agent into the cooling agent), in which the so-called partial pressure of the cooling agent drops without, however, necessitating a drop in actual total pressure, results in an evaporation of the methyl-amine whereby heat is abstracted from the surroundings of the evaporator, or, in other words, refrigeration is produced.

The methyl-amine gas and hydrogen mixed in the evaporator flow downwardly therein and through pipe 18 into the lower part of the absorber 21. In the absorber the gas mixture comes into contact with weak absorption liquid supplied thereto from the generator 9 through pipe 25 and distributor 22, that is, with liquid in which there is no or only a very small amount of methyl-amine dissolved. By this grouping of the gaseous mixture and the absorption liquid, which, in the illustration given, is water, the result is an absorption or dissolving of methyl-amine by water and a liberation of hydrogen. Since hydrogen is of markedly different specific weight than methyl-amine and since hydrogen is very much lighter than methyl-amine, it will be seen that the weight of gas in the absorber per unit of volume is very much less than the weight of gaseous mixture per unit volume in the evaporator. Therefore, with a suitable interconnection of the evaporator and absorber, there will be a preponderance of downwardly directed gravitational force in the evaporator which causes automatic circulation of gas between and through the evaporator and absorber. This may be expressed by saying that a head is produced due to the difference in specific weights of the mixture of vapor of the cooling agent and the gaseous auxiliary agent on the one hand and the auxiliary agent itself on the other hand, since head is a measure of preponderating force of vertically extending bodies of different specific weights. The hydrogen passes upwardly in the absorber and through pipe 20 into the upper part of the evaporator where it is again mixed with the heavier methyl-amine vapor and is carried downwardly as part of the mixture through pipe 18 to the lower part of the absorber.

Circulation between the generator and the absorber is effected as follows:

The strong absorption liquid saturated with methyl-amine is carried from the absorber through pipe 24 and coil 26 due to the influence of heat applied to coil 26 which, in this case, receives its heat from the same source as the generator 9. The liquid in the absorber is thus raised to the higher level of liquid in the generator by application of heat. Liquid flows from the generator to the absorber through conduit 25 due to the fact that the level of liquid is higher in generator 9 than in the absorber.

Figure 2 shows a modification of the apparatus of Figure 1 wherein the generator is heated by means of an electrode 28 extending into a chamber 29 in the generator. The pipe 24 leading from the absorber into the generator is in this case formed, in part, as a coil 27 surrounding electrode 28 outside the generator. From the coil 27 the liquid passes through an upwardly extended portion of conduit 24 to or near the level of the upper end of pipe 24 in Figure 1.

Referring to Figure 3, methyl-amine is as before vaporized in generator 9 and passes through conduit 11 to condenser 13 from which condensed methyl-amine passes through the evaporator 19. In this modification, the auxiliary agent which preferably consists of isobutane is condensed, on passing from the absorber 21 to the evaporator 19, in a condenser 31. By this means both the methyl-amine and the auxiliary agent serve to produce refrigeration by evaporation, one agent diffusing into the other respectively. Pipes 12 and 32 which conduct liquid from condensers 13 and 31, respectively, open into the lower part of evaporator 19 below the liquid therein and contain columns of liquid serving to force the gas mixture through conduit 18, which, in this case is connected to the upper part of the evaporator, and through the liquid in the absorber. The gas mixture formed in the evaporator passes through a perforated plate 36 provided immediately above the gas inlet to the absorber, being thus distributed and brought into close contact with the absorption liquid. Methyl-amine is absorbed by water in the absorber and carried to the generator through conduit 35 and coil 26. The generator in this case is heated by a steam jacket 37. Circulation is effected between the generator and absorber by means of conduits 34 and 35 and coil 26. Application of heat to coil 26 causes an upward rise of liquid therein, and causes flow of liquid through conduit 34 from the generator to the absorber and flow through conduit 35 from the absorber to the coil 26.

It will be clear from the aforesaid that the use of amines, particularly methyl-amine, as a refrigerating medium in the class of absorption-machines referred to gives unusual results greatly superior to those obtained with ammonia as a refrigerant chiefly on account of the following grounds:

1. The pressure of the saturated vapor is half as high for methyl-amine as for ammonia which is of special importance when the temperature of the cooling medium for the condenser is high.

2. Greater solubility in water for methyl-amine than for ammonia.

3. Specific weight of methyl-amine vapor is about twice that of ammonia vapor.

4. The latent heat of liquefied methyl-amine is greater that that of ammonia for equal molar quantities.

5. Less water vapor is entrained with the vapor of the refrigerant when using amines.

6. Less water vapor is entrained with the inert gas from the absorber to the evaporator when using amines.

Having thus described our invention what we claim is:—

1. The method of refrigerating which comprises separating methyl-amine in gaseous form from a solution thereof, condensing the methyl-amine, introducing the condensed methyl-amine into the presence of an auxiliary agent, and producing complementary diffusion of the methyl-amine and the auxiliary agent, absorbing the methyl-amine into solution and again separating methyl-amine from solution.

2. The method of refrigerating which comprises separating an amine in gaseous form from a solution thereof, condensing the amine, introducing the condensed amine into the presence of an auxiliary agent and producing complementary diffusion of the amine and the auxiliary agent, absorbing the amine into solution and again separating the amine from solution.

3. A process of refrigerating which comprises evaporating a liquid amine in the presence of an auxiliary agent, producing a head due to difference in specific weights of a mixture of the vapor of the amine and the auxiliary agent on the one hand and the auxiliary agent on the other hand, forcing the mixture of the amine and auxiliary agent into the presence of an absorption liquid under the influence of the head produced, absorbing the amine in the absorption liquid, withdrawing the absorption liquid from the presence of the auxiliary agent, returning the auxiliary agent into the presence of the amine under the influence of the head produced, heating the absorption liquid and abstracting the amine from solution, condensing the amine and returning the condensed amine to the presence of the auxiliary agent.

4. The method of refrigerating which comprises separating mono-methyl-amine in gaseous form from a solution thereof in water, condensing the mono-methyl-amine, introducing the condensed mono-methyl-amine into the presence of a fluid auxiliary agent and producing complementary diffusion of the mono-methyl-amine and the auxiliary agent, absorbing the mono-methyl-amine into solution and liberating the auxiliary agent, returning the liberated auxiliary agent into the presence of condensed mono-methyl-amine and again separating the mono-methyl-amine from solution.

5. A process of refrigerating which comprises evaporating a liquid mono-methyl-amine in the presence of an auxiliary agent, producing a head due to difference in specific weights of a mixture of the vapor of the mono-methyl-amine and the auxiliary agent on the one hand and the auxiliary agent on the other hand, forcing the mixture of the mono-methyl-amine and auxiliary agent into the presence of an absorption liquid under the influence of the head produced, absorbing the mono-methyl-amine in the absorption liquid, withdrawing the absorption liquid from the presence of the auxiliary agent, returning the auxiliary agent into the presence of the mono-methyl-amine under the influence of the head produced, heating the absorption liquid and abstracting the mono-methyl-amine from solution, condensing the mono-methyl-amine and returning the condensed mono-methyl-amine to the presence of the auxiliary agent.

6. A process of refrigerating which comprises evaporating liquid mono-methyl-amine in the presence of hydrogen, producing a head due to difference in specific weights of a mixture of the vapor of the mono-methyl-amine and hydrogen on the one hand and hydrogen on the other hand, forcing the mixture of the mono-methyl-amine and hydrogen into the presence of an absorption liquid under the influence of the head produced, absorbing the mono-methyl-amine in the absorption liquid, withdrawing the absorption liquid from the presence of the hydrogen, returning the hydrogen into the presence of the mono-methyl-amine under the influence of the head produced, heating the absorption liquid and expelling mono-methyl-amine from solution, condensing the mono-methyl-amine and returning the condensed mono-methyl-amine to the presence of the hydrogen.

7. A method of refrigerating which comprises separating an amine in gaseous form from a solution thereof, condensing the amine, mixing the condensed amine with liquid isobutane, evaporating the liquid mixture, absorbing the amine into solution separating the isobutane from the solution, condensing the isobutane, again separating the amine from solution and condensing the same, and again mixing the amine and isobutane condensates.

8. A method of refrigerating which comprises separating methyl-amine in gaseous form from a solution thereof, condensing the methyl-amine, mixing the condensed methyl-amine with liquid isobutane, evaporating the liquid mixture, absorbing the amine into solution, separating the isobutane from the solution, condensing the isobutane, again separating the methyl-amine from solution and condensing the same, and again mixing the methyl-amine and isobutane condensates.

9. A method of refrigerating which comprises separating a refrigerant in gaseous form from a solution thereof, condensing the refrigerant, mixing the condensed refrigerant with liquid $C_4H_{10}$, evaporating the liquid mixture, absorbing the refrigerant into solution, separating the $C_4H_{10}$ from the solution, condensing the $C_4H_{10}$, again separating the refrigerant from solution and condensing the same, and again mixing the refrigerant and $C_4H_{10}$ condensates.

10. A process of refrigerating through the agency of an absorption system which comprises evaporating a refrigerant in the presence of a fluid of the methane series and absorbing heat, producing a liquid column head, forcing the mixture of diffused fluids into the presence of absorption liquid under the influence of said liquid column head whereby the methane fluid is liberated and the refrigerant is absorbed, separating the absorption liquid from the methane fluid, heating the absorption liquid to expel the refrigerant, and returning the fluids into the presence of each other while condensing fluid on its way to diffusion.

11. That improvement in the art of refrigerating by the aid of an absorption system using an amine as a refrigerant which consists in partially equalizing pressure due to an auxiliary agent and partially equalizing the pressure due to a liquid column.

12. That improvement in the art of refrigerating by the aid of an absorption system using $C_4H_{10}$ as a refrigerant which consists in equalizing the pressure partly by an auxiliary medium and partly due to a liquid column.

BALTZAR CARL von PLATEN.
CARL GEORG MUNTERS.